United States Patent [19]

Neaume

[11] Patent Number: 4,696,134
[45] Date of Patent: Sep. 29, 1987

[54] DEVICE FOR MARKING OUT LAND

[76] Inventor: Robert Neaume, Bourpeuil-le Vigeant, 86150 l'Isle Jourdain, France

[21] Appl. No.: 881,056

[22] Filed: Jul. 1, 1986

[30] Foreign Application Priority Data

Jul. 9, 1985 [FR] France ................. 85 10500

[51] Int. Cl.⁴ .............................................. E01F 9/02
[52] U.S. Cl. ............................................ 52/103; 52/155
[58] Field of Search ...................... 52/102, 103, 155

[56] References Cited

U.S. PATENT DOCUMENTS

| | | | |
|---|---|---|---|
| 1,268,459 | 6/1918 | Hjermstad | 52/155 |
| 1,320,081 | 10/1919 | Martin | 52/155 |
| 2,154,966 | 4/1939 | Vanderveer | 52/103 |
| 3,080,024 | 3/1963 | Clevett | 52/155 |
| 3,279,133 | 10/1966 | DeKorte | 52/103 |
| 3,507,081 | 4/1970 | Gallup | 52/103 |
| 3,516,171 | 6/1970 | Martin . | |
| 3,754,360 | 8/1973 | Herr | 52/103 |
| 4,185,424 | 1/1980 | Streit . | |
| 4,254,597 | 3/1981 | Feldman et al. | 52/103 |
| 4,502,258 | 3/1985 | Rushing | 52/103 |

FOREIGN PATENT DOCUMENTS 0101757 3/1984 European Pat. Off. .

Primary Examiner—William F. Pate, III
Assistant Examiner—Creighton Smith
Attorney, Agent, or Firm—Wenderoth, Lind & Ponack

[57] ABSTRACT

A device for marking out land includes a stake of flexible plastics material including a stem which has a point at its lower end and which is extended in its upper part by a marker head. The stem has an upper region which is less rigid than the lower region which is adapted to be driven into the ground.

5 Claims, 5 Drawing Figures

U.S. Patent     Sep. 29, 1987     4,696,134
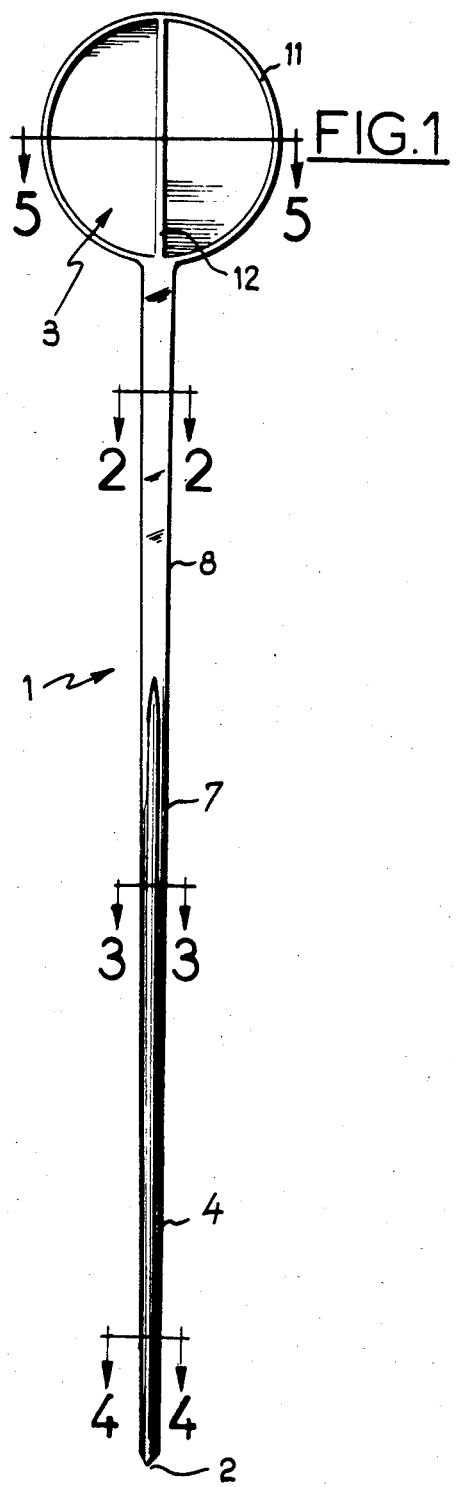
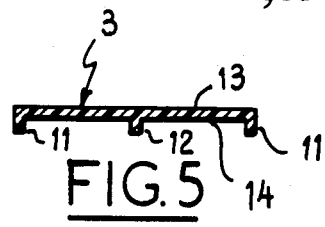
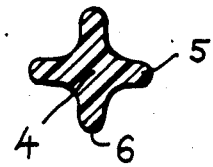

DEVICE FOR MARKING OUT LAND

BACKGROUND AND SUMMARY OF THE INVENTION

The present invention relates to a device for marking out land and in particular agricultural land.

This device is intended in particular to materialize on agricultural land the paths through which various agricultural machines must travel, in particular for applying manure or ground treating products or crops.

The land marking our device according to the invention comprises a stake of flexible plastics material including a stem which has a point at its lower end and is extended in its upper part by a marker head, said stem having an upper region which is less rigid than the lower region which is adapted to be driven into the ground.

The device according to the invention is such that it can be easily driven into the ground while its upper part is capable of bending upon the passage thereove of agricultural machines. Further, the presence of a marker head constitutes an easily visible reference for indicating the path along which the various agricultural machines must travel.

According to a preferred embodiment, the lower region of the stem has a cross-shaped section defined by a first arm extending longitudinally to the marker head with a width which gradually increases in the direction of the marker head, and a second arm which tapers off at least in the vicinity of the marker head.

Such a stem has sufficient rigidity in its lower part to enable it to be driven into the ground and great flexibility in the vicinity of the marker head.

In an advantageous embodiment of the invention, the marker head is substantially planar and extends as an extension of the first arm. This marker head has advantageously a rigidity at the most equal to that of the upper region of the stem.

The plastics material constituting the whole of the stake may be in particular a polyolefin, such as low density polyethylene, high density polyethylene or polypropylene. This polyolefin may have a density of 0.90 to 0.96 and a tensile strength of $8.10^6$ Pa to $35.10^6$ Pa. Further, this polyolefin advantageously has a fragility point which does not appear before $-70°$ C. according to the standar ASTM D 995-51.

BRIEF DESCRIPTION OF THE DRAWINGS

The invention is described hereinafter in more detail with reference to the accompanying drawings of only one embodiment In the drawings:

FIG. 1 is a view of a device according to the invention;

FIGS. 2, 3, and 4 are cross-sectional views of the device shown in FIG. 1 to taken along lines 2—2, 3—3 and 4—4 thereof, respectively, and on an enlarged scale; and FIG. 5 is a cross-sectional view of the device shown in FIG. 1 taken along line 5—5 thereof.

DETAILED DESCRIPTION OF THE INVENTION

The marking out device shown in the drawings is made by moulding polypropylene.

The device comprises a stem 1 which is provided with a point 2 at its lower end and is extended in its upper part by a marker head 3. The stem 1 includes a lower region 4 having a cross-shaped section as shown in FIG. 4, this lower region comprising mainly two arms 5 and 6 which extend longitudinally and the axes of which in section are perpendicular. The ends of arms 5, 6 are rounded and arms 5, 6 are interconnected rounded fillets. The arm 5 extends longitudinally up to the marker head 3 with a progressively increasing width in the direction of the marker head 3. The second arm 6, which extends into the lower region 4, gradually tapers off in an intermediate region 7 and completely disappears in an upper region 8.

Thus, in the upper region 8, as shown in FIG. 2, the cross-section of the stem 1 has a flattened rectangular shape, while in the intermediate region 7, such as shown in FIG. 3, the section has a generally rectangular shape but includes two rounded bosses 9 in the center of the two main sides. Further, as is clear from FIG. 3, the thickness of the rectangular sectioned stem in the intermediate region 7 is slightly greater than the thickness of the stem in the upper region 8.

Thus, the stem has three regions having distinct rigidities. The lower region 4, provided with the point 2 which is adapted to be driven into the ground, has sufficient rigidity to permit this. The intermediate region 7 has a slightly lower rigidity than the lower region 4, while in the upper region 8, the rigidity becomes distinctly less.

As shown in FIG. 1, the upper region 8 is extended by marker head 3 formed by a plate having a generally circular shape with a peripheral rib 11 and a longitudinal rib 12 extending the axis of the stem 1.

These ribs serve as reinforcements of the circular plate and thus permit a reduction in the amount of plastics material required for producing this head. The thickness of the head is however so adjusted that the rigidity of the head is no higher than that of the upper region of the stem 1. Markings may be provided on the planar side 14 of the head 3 while the other side 13 may carry for example advertising supports or any other indication affording some advantage in the use of this device.

As a modification, the upper region 8 may be eliminated and the rod then only has a lower region and an intermediate region in which the second arm 6 tapers off.

It must be understood that the device according to the invention may have other shapes. In particular, the marker head may have a rectangular or trapezoidal shape.

Further, the lower end may be provided with a metal end member.

What is claimed is:

1. A device for marking out land, in particular agricultural land, said device comprising a stake of flexible plastics material including a stem which has a point at a lower end thereof and which is extended at an upper end thereof by a marker head formed integrally with said stem, said stem having an upper region integral with said marker head and a lower region including said point and adapted to be driven into the ground, said upper region being less rigid than said lower region, said lower region of said stem having a cross-shaped section defined by a first arm extending longitudinally of said stem up to said marker head with a gradually increasing width in the direction of said marker head, and a second arm which crosses said first arm in section and which tapers out at least in the vicinity of said marker head.

2. A device according to claim 1, wherein said marker head is substantially planar and is an extension of said first arm.

3. A device according to claim 2, wherein said marker head has a rigidity at the most equal to the rigidity of said upper region of said stem.

4. A device according to claim 1, wherein said plastics material of the whole of said stake is a polyolefin.

5. A device according to claim 4, wherein said polyolefin has a density of 0.90 to 0.96 and a tensile strength of $8.10^6$ Pa to $35.10^6$ Pa.

* * * * *